United States Patent
Vuille et al.

(10) Patent No.: US 10,691,070 B2
(45) Date of Patent: Jun. 23, 2020

(54) SAFETY VALVE FOR WATCHES

(71) Applicant: The Swatch Group Research and Development Ltd, Marin (CH)

(72) Inventors: Pierry Vuille, Les Emibois (CH); Michel Willemin, Preles (CH); Jean-Claude Martin, Montmollin (CH)

(73) Assignee: The Swatch Group Research and Development Ltd, Marin (CH)

( * ) Notice: Subject to any disclaimer, the term of this patent is extended or adjusted under 35 U.S.C. 154(b) by 190 days.

(21) Appl. No.: 16/020,161

(22) Filed: Jun. 27, 2018

(65) Prior Publication Data
US 2019/0018369 A1    Jan. 17, 2019

(30) Foreign Application Priority Data

Jul. 14, 2017 (EP) .................................... 17181525

(51) Int. Cl.
G04B 37/08    (2006.01)
G04B 37/02    (2006.01)
F16K 17/04    (2006.01)

(52) U.S. Cl.
CPC ............ *G04B 37/088* (2013.01); *F16K 17/04* (2013.01); *G04B 37/02* (2013.01)

(58) Field of Classification Search
CPC .... G04B 37/10; G04B 37/0091; G04B 37/02; G04B 37/0088; G04B 37/08; F16K 17/04
See application file for complete search history.

(56) References Cited

U.S. PATENT DOCUMENTS

| 4,160,463 | A | 7/1979 | Akkerman et al. |
| 5,257,247 | A | 10/1993 | Miche et al. |
| 8,333,503 | B2 * | 12/2012 | Hiranuma ............... G04B 37/08 368/286 |
| 8,333,504 | B2 * | 12/2012 | Hozumi ................. G04B 37/08 368/286 |

(Continued)

FOREIGN PATENT DOCUMENTS

| DE | 16 78 780 U | 6/1954 |
| EP | 0 554 797 A1 | 8/1993 |

(Continued)

OTHER PUBLICATIONS

European Search Report dated Jan. 24, 2018 in European application 17181525.1, filed on Jul. 14, 2017 ( with English Translation of Categories of Cited Documents).

*Primary Examiner* — Sean Kayes
(74) *Attorney, Agent, or Firm* — Oblon, McClelland, Maier & Neustadt, L.L.P.

(57) ABSTRACT

The present invention relates to a safety valve including:
  a tube intended to be fixed to a watch case,
  a hollow head mounted for rotation about the tube,
  a first element fixedly mounted with respect to the head and
  a second element integral with the head,
wherein the first element and the second element each include one or more passages allowing gas to flow, the rotational motion of the head allowing the passages of the first element and of the second element to be placed in communication for gas to escape from the interior to the exterior of the case in case of overpressure inside the case or, conversely, allowing the passages of the first element and of the second element to be moved out of alignment to prevent gas escaping.

17 Claims, 3 Drawing Sheets

(56) References Cited

U.S. PATENT DOCUMENTS

| | | | | |
|---|---|---|---|---|
| 8,408,785 B2* | 4/2013 | Hiranuma | .............. | G04B 37/02 368/291 |
| 8,419,269 B2* | 4/2013 | Hiranuma | .............. | G04B 37/08 368/291 |
| 2011/0051570 A1* | 3/2011 | Hiranuma | .............. | G04B 37/02 368/291 |
| 2011/0051571 A1* | 3/2011 | Hiranuma | .............. | G04B 37/02 368/291 |
| 2011/0051572 A1* | 3/2011 | Hozumi | ................ | G04B 37/02 368/291 |
| 2011/0235476 A1* | 9/2011 | Hiranuma | .............. | G04B 37/02 368/291 |
| 2011/0235477 A1* | 9/2011 | Hiranuma | .............. | G04B 37/02 368/291 |

FOREIGN PATENT DOCUMENTS

| | | |
|---|---|---|
| EP | 0 884 660 A1 | 12/1998 |
| FR | 2 406 143 A1 | 5/1979 |

* cited by examiner

SAFETY VALVE FOR WATCHES

This application claims priority from European Patent Application No. 17181525.1 filed on Jul. 14, 2017; the entire disclosure of which is incorporated herein by reference.

FIELD OF THE INVENTION

The present invention relates to a safety valve for a watch, and more specifically for a wristwatch intended for underwater diving. The present invention also relates to the watch provided with said valve.

BACKGROUND OF THE INVENTION

Helium escape valves are present in some dive watches for removing helium that has penetrated the watch case during saturation dives where divers inhale a gas mixture containing helium and oxygen. This allows them to stay inside a diving bell or underwater habitat for several days. During this time period, helium may penetrate the watch. In the absence of such a valve, the excess internal pressure caused by helium that has seeped in may, during the decompression phase, cause damage to the watch, such as, for example, loss of the crystal which may pop out or break.

Helium escape valves can be manual or automatic. Manual valves operate simply by tightening a sealing element, such as a head, onto the case middle, in the same way as a screw-in crown. Manual valves have the drawback that the watch is not water-resistant if the valve is not tightened up again after use. Automatic valves are activated automatically, as their name indicates, when the difference in pressure between the inside of the watch case and the external environment reaches a critical threshold. A first type of automatic valve is one that the user cannot block, the principles of which are described in Swiss Patent No CH491246. This valve, which, in most cases, is mounted flush with the case middle takes the form of a simple valve limiting the pressure inside the watch case. The drawback of this type of valve is that it opens automatically with no possibility of stopping gas escaping and therefore of fluid entering the watch, which is problematic when decompression is performed in a humid environment. To overcome this drawback, there is a second type of automatic valve which can be operated by the user by screwing/unscrewing the head, which causes an axial displacement of the latter, as described in European Patent No EP0554797. This second type of valve could be incorporated in a push button as disclosed in European Patent No EP2685327.

The valve of EP0554797 includes a hollow head provided with a skirt and a central core extended by a shaft. The head can be screwed onto a tube attached to the case middle forming part of the timepiece case. The tube includes a bottom through which the shaft passes with clearance. The core and the shaft are surrounded by a helical return spring. The spring is supported under the head via its first end. The second end of the spring is supported on a ring which in turn compresses a first sealing gasket disposed on the bottom of the tube. A second sealing gasket is arranged under the head opposite the tube. When the head is screwed onto the threaded portion of the tube, the second sealing gasket is pressed against the tube. Thereafter, the valve is inoperative and completely sealed via the second gasket and the effect of the spring on the first gasket. When the head is unscrewed, the second gasket under the head is no longer active and the gasket at the bottom of the tube is able to rise up against the return force of the spring when the pressure within the case becomes higher than the pressure outside. Gas is then evacuated from the interior of the watch to the exterior.

This second type of valve has the drawback that the head is mounted on the tube via a screw thread. Given that, throughout its life, the head is mainly in the rest position, i.e. the screwed-in position, there is a risk that the user will no longer be able to loosen it when the time comes. Further, excessive tightening of the head onto the tube risks, over time, damaging the second gasket positioned under the head. Conversely, insufficient tightening of the head risks keeping it in the open position.

SUMMARY OF THE INVENTION

To overcome the aforecited drawbacks, it is a main object of the present invention to propose a new helium escape valve that combines the advantages of an automatic valve with intervention by the user, while dispensing with the use of a screw thread for the connection between the head and the tube.

To this end, the present invention provides a valve according to claim 1.

Preferably, the valve includes a head mounted for rotation only about the tube, i.e. without axial movement of the head via a screw thread. The head is capable of moving between an open position, wherein the gas is able to escape outside the case in case of overpressure, and a closed position wherein gas is prevented from escaping. More specifically, the present invention relates to a valve comprising a first fixed element and a second movable element, whose movement is linked to the angular movement of the head. The two elements are each provided with one or more orifices or recesses. According to the invention, the relative movement between the two elements makes it possible to place the orifices of each element in fluid communication when it is desired to let gas escape, or conversely, to prevent gas escaping by not placing the orifices of each element opposite each other.

Other advantages will appear from the features set out in the claims, and from the detailed description of the invention illustrated hereinafter with reference to the annexed drawings, provided as non-limiting examples.

BRIEF DESCRIPTION OF THE DRAWINGS

In FIGS. 1 and 2, the head is in the closed position with, in FIG. 1, substantially equal pressure between the interior and exterior of the watch case, and in FIG. 2, overpressure inside the watch case. In FIGS. 3 and 4, the head is in the open position with, in FIG. 4, a difference in pressure between the interior and exterior of the watch case causing gas to escape outside the watch case.

In FIG. 5, the valve is in the closed position with the internal pressure and external pressure of the watch case substantially equal.

In FIG. 6, the valve is in the open position with overpressure inside the case causing gas to escape outside the watch case.

DETAILED DESCRIPTION OF THE INVENTION

The present invention relates to a helium escape valve, which will also be referred to as a safety valve.

Figure 1:
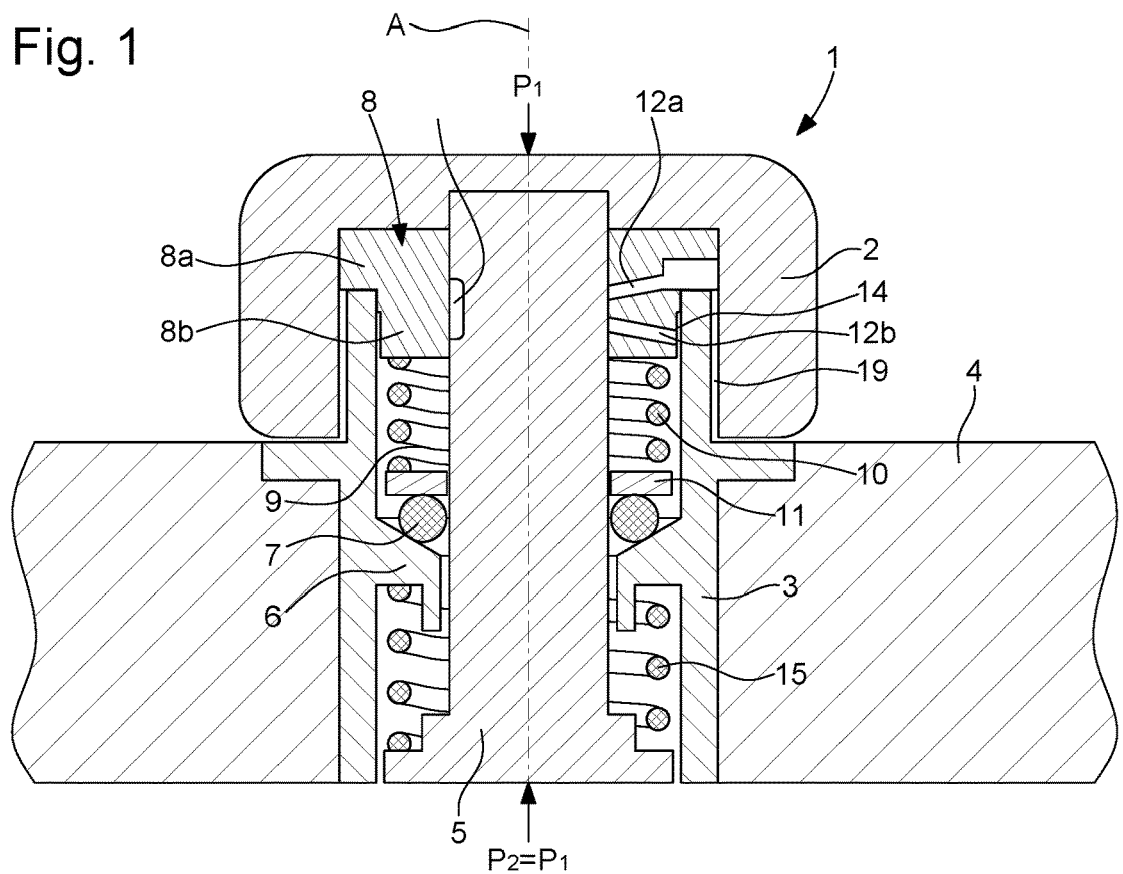
FIGS. 1 to 4 are cross-sectional views of the helium escape valve of the invention fixed to a watch case.
Figure 5:
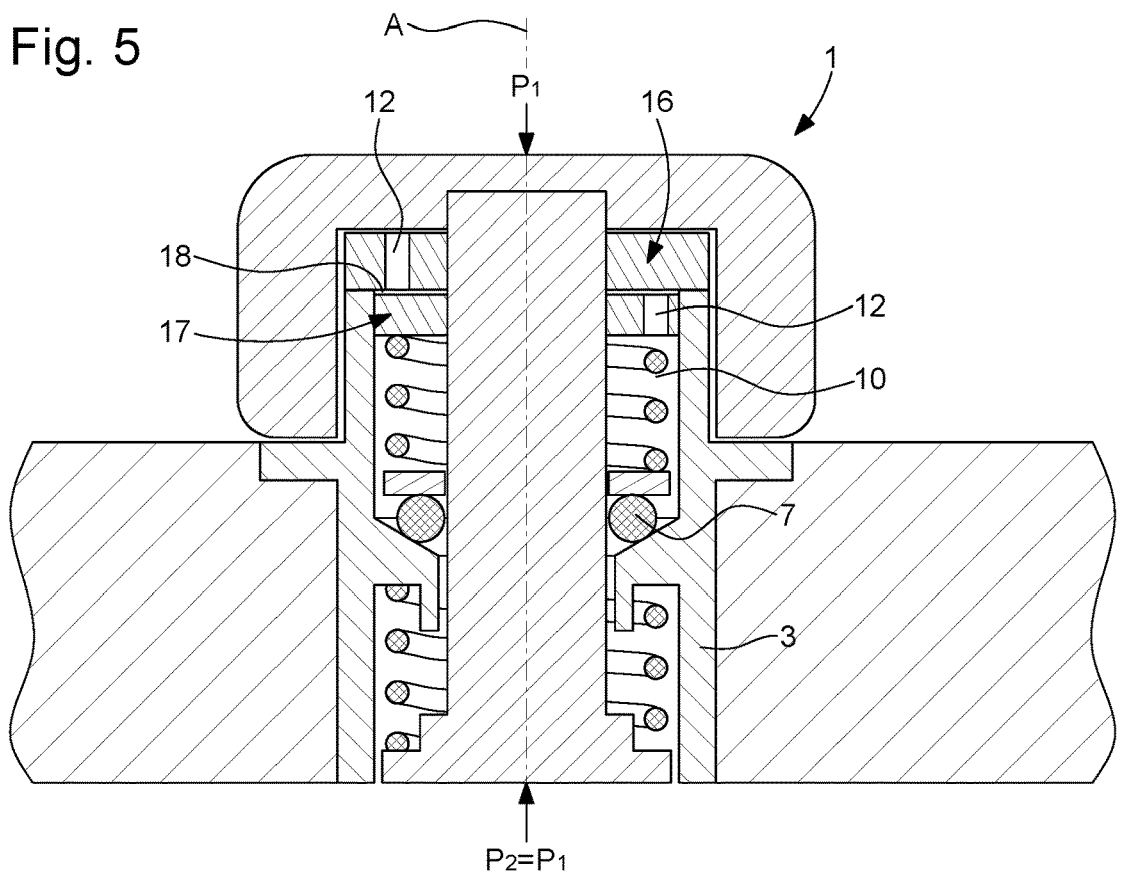
FIGS. 5 and 6 represent a variant of the helium escape valve of FIGS. 1 to 4.

Valve 1 represented, amongst others, in FIGS. 1 and 5, includes a hollow cylindrical head 2 mounted on a tube 3 extending along an axis A, tube 3 being intended to be fixed to watch case 4, for example by screwing down. Valve 1 includes a shaft 5 integral with head 2, which extends inside the volume delimited by hollow head 2 and by tube 3 and passes through a step portion 6 disposed in the lower part of the valve. Head 2 is rotatably mounted about tube 3 between an open position, wherein the gas is able to escape outside the case, and a closed position wherein gas is prevented from escaping. The open and closed positions are respectively represented in FIGS. 3 (and 4 and 6) and 1 (and 2 and 5).

As represented in FIG. 1, valve 1 has a double seal with, on the one hand, a gasket 7 arranged inside tube 3 against step portion 6 and, on the other hand, a polymer material 8 that fills the internal volume of the valve in its upper portion. The annular polymer material 8 fills a space (material 8*a*) delimited by the inner wall of hollow head 2, the upper end of tube 3 and shaft 5 and can extend partly inside tube 3 in the space (material 8*b*) delimited by the inner wall of tube 3 and by shaft 5.

Valve 1 includes in tube 3 inside a chamber 9, a spring 10 wound around shaft 5 and resting at one end on the polymer material 8 and, at the other end, on a ring 11 which compresses gasket 7 against step portion 6 when internal pressure P2 and external pressure P1 are substantially equal or when P1 is higher than P2, for example under water.

According to the invention, polymer material 8 includes at least one open orifice 12 extending over the thickness of annular material between shaft 5 and the inner wall of tube 3 or of hollow head 2. In the configuration of FIG. 1, polymer material 8 includes two through orifices 12*a* and 12*b* arranged in a non-joined manner at different levels in the material. A first orifice 12*a* passes through material 8*a* and a second orifice 12*b* passes through material 8*b*.

Figure 3:
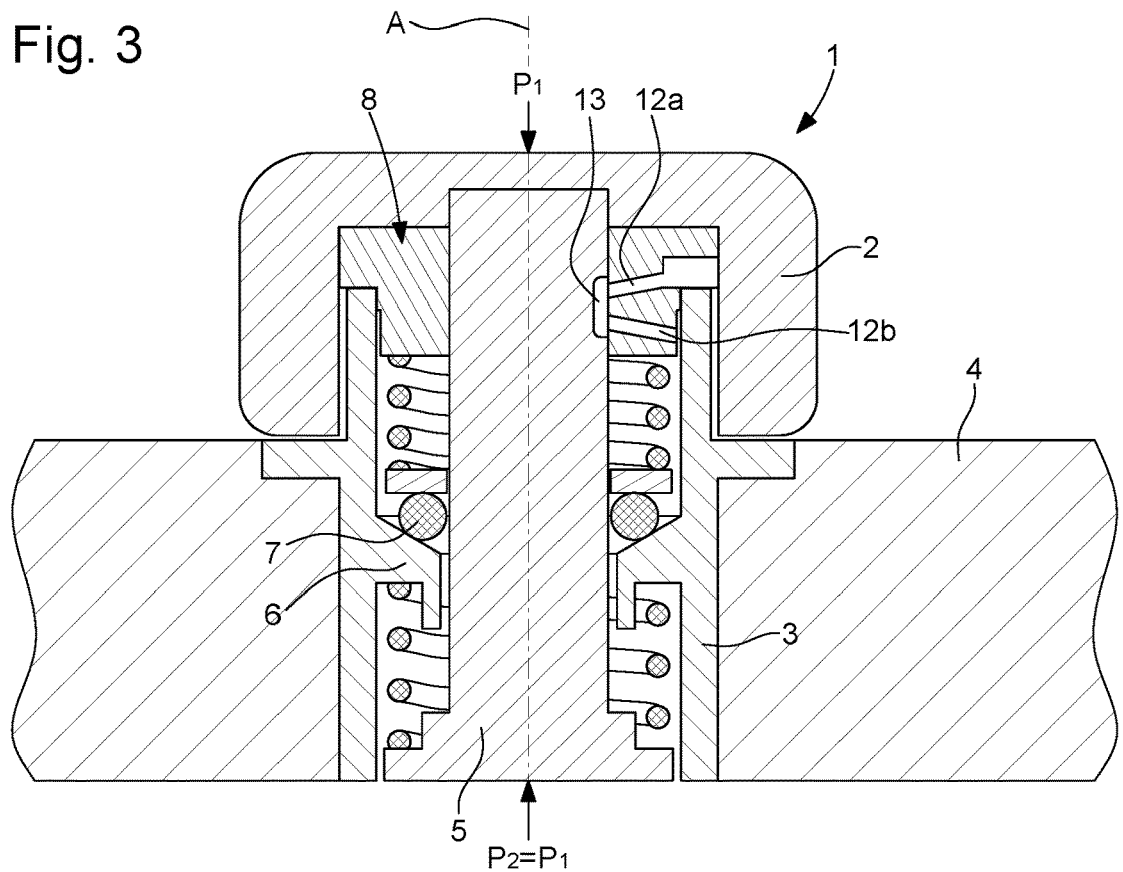

On one portion of its circumference, shaft 5 includes a recess 13 intended to place in communication the two through orifices 12*a* and 12*b* when recess 13 is placed opposite said orifices 12*a*, 12*b* (FIG. 3).

According to the invention, a path 14 is arranged between polymer material 8*b* and the inner wall of tube 3 to allow gas to flow from chamber 9 towards second orifice 12*b*.

In the illustrated example, valve 1 includes another spring 15 arranged around shaft 5 underneath step portion 6 towards the base of the shaft. The function of this spring is to apply a return force on the head to prevent any axial movement of the latter. Other non-elastic means, such as a thrust ball bearing, etc. could be envisaged for performing this function. Further, according to the invention, the angular displacement of the head about axis A between the open and closed positions could be limited by a stop (not represented).

The polymer material is made sufficiently elastic to fulfil its sealing function in a lasting manner, after being repeatedly compressed by the spring. For example, the choice of material may incline towards polyurethanes, in particular Asutane® (a material from the Polymers Division of Swatch Group R&D), elastomers (NBR or the like), thermoplastics (PEEK, PA or the like), thermoset or other composites, for example reinforced with fibres or nanoparticles (for example carbon, cellulose, etc.). According to the invention, the cylinder made of polymer material can be driven into the tube and the shaft driven into the cylinder.

Figure 2:
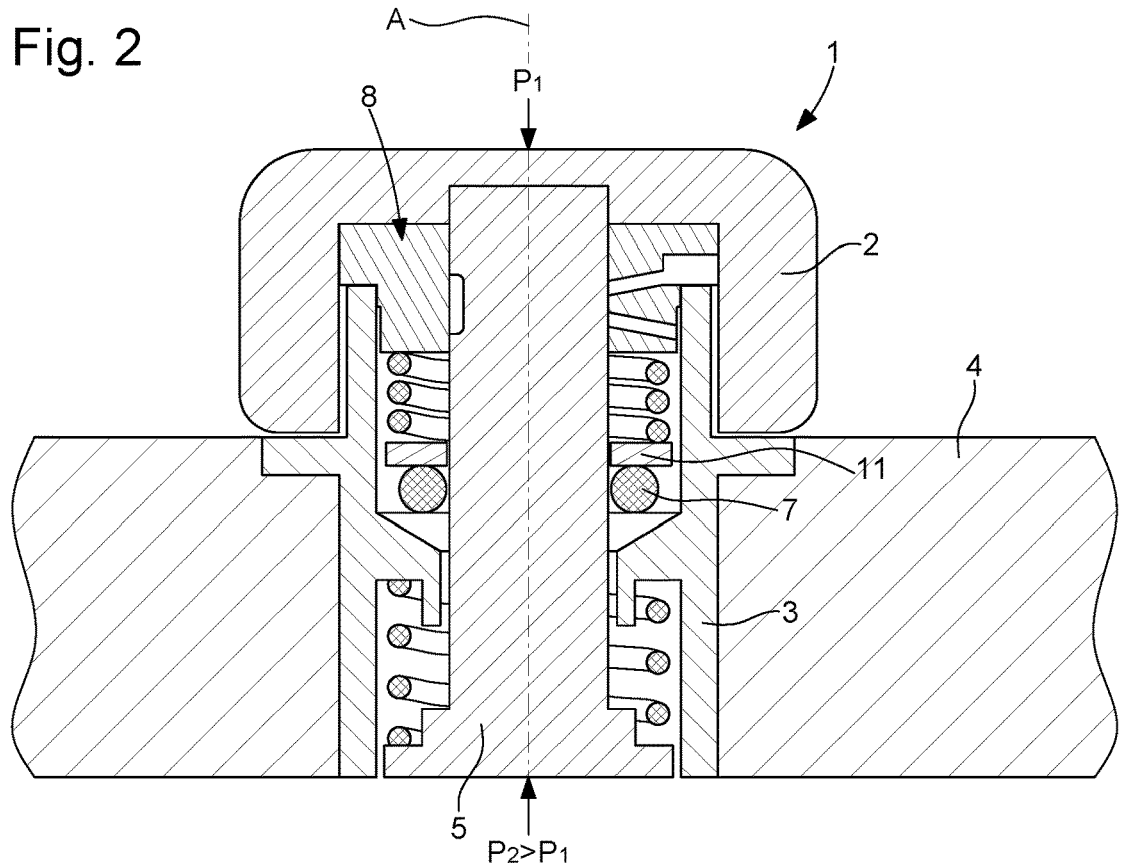

FIGS. 1 to 4 illustrate the operation of the valve according to the invention. In FIGS. 1 and 2, head 2 is in the closed position, i.e. the two orifices 12*a*, 12*b* are not facing recess 13 provided in shaft 5. In the absence of a pressure difference between the interior of the watch case (pressure P2) and the external environment (pressure P1=P2), gasket 7 is compressed against step portion 6 and the valve is completely sealed (FIG. 1). In the presence of overpressure inside the watch case (P2>P1), gasket 7 is no longer active due to the helium pressure lifting the latter (FIG. 2). Nonetheless, sealing of the valve is ensured by polymer material 8.

Figure 4:
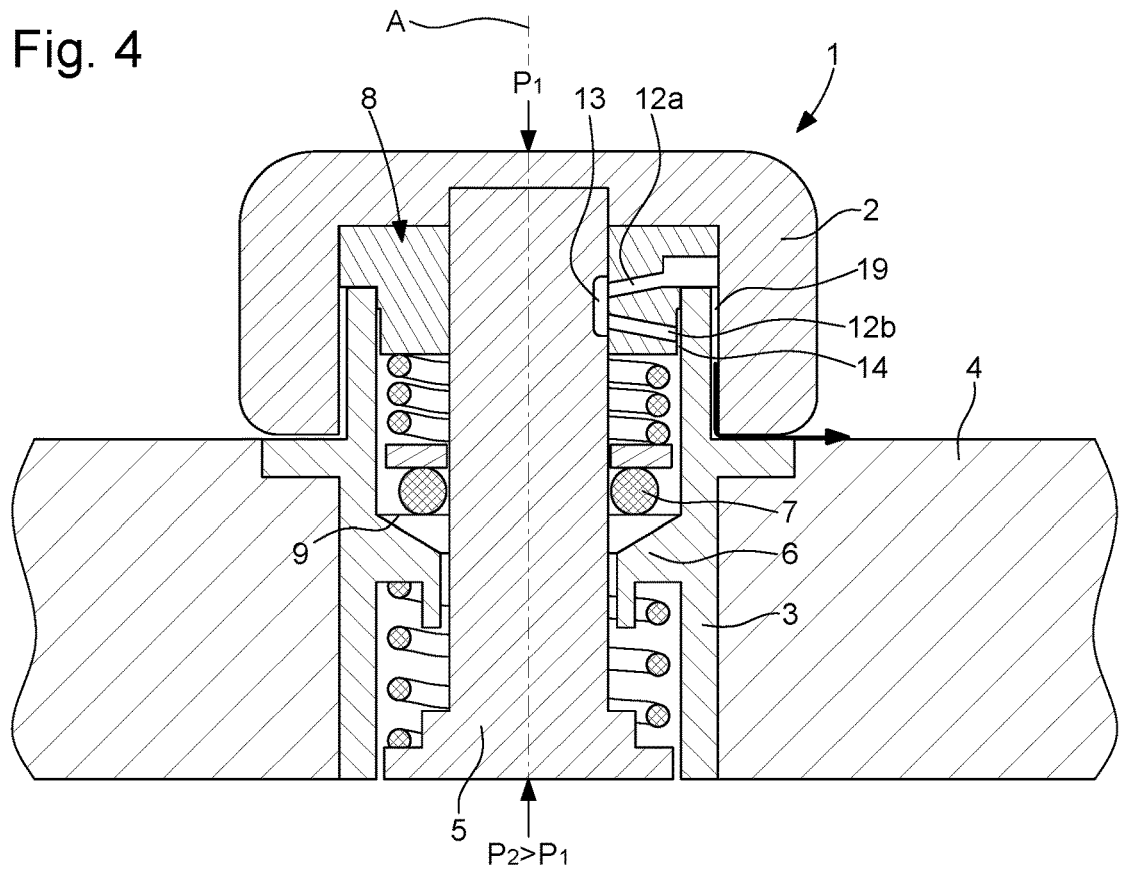

Rotating the head about axis A by a given angle of less than 360°, which is 180° in the example illustrated in FIGS. 3 and 4, places the head in the open position. In the open position, recess 13 is placed opposite one end of orifices 12*a*, 12*b* to place the interior and exterior of the case in fluid communication. If the internal pressure is equal to the external pressure (P1=P2), gasket 7 remains compressed against support step 6 and consequently the valve remains sealed (FIG. 3). Conversely, when the internal pressure exceeds the external pressure (P2>P1) by a predefined value sufficient to counteract the return force of first spring 10, gasket 7 also becomes inoperative, which allows gas to escape outside the watch case to balance the pressures (FIG. 4). The gas flows from the base of the valve through the clearances between tube 3 and shaft 5 and passes in succession through chamber 9, path 14, second orifice 12*b*, recess 13, first orifice 12*a* and gap 19 between the external wall of tube 3 and the internal wall of head 2 to eventually be released outside watch case 4.

Other configurations of the valve according to the invention can be envisaged. For example, it is possible to make a single through orifice in the polymer material and to provide a recess in the shaft that directly places the chamber containing the spring in communication with the through orifice when the head is in the open position. Several configurations are therefore possible without departing from the scope of the invention.

Figure 6:
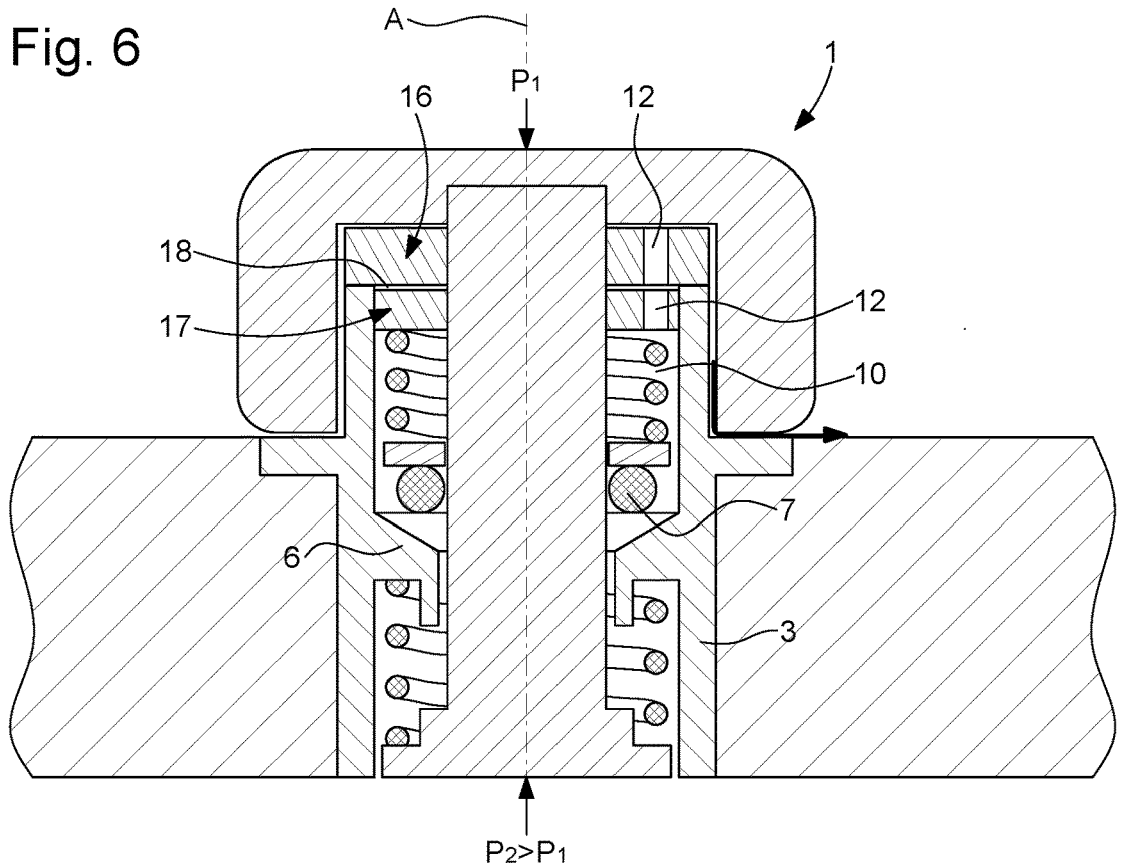

In this regard, FIGS. 5 and 6 show a variant of valve 1 according to the invention based on the same principle of placing orifices opposite each other following rotation of the valve head. In this variant, a first disc 16, for example made of ceramic, provided with one or more orifices 12, is placed under head 2 and integral with shaft 5. Underneath this first disc 16, there is placed a second disc 17, for example made of ceramic, which is fixed and integral with tube 3. This second disc 17 is also provided with one or more orifices 12 intended to be positioned opposite those of first disc 16 once head 2 has been moved into its open position. In the illustrated example, orifices 12 pass right through each disc 16, 17 and allow gas to escape via a gap between head 2 and first disc 16. Other configurations that are not represented can be envisaged, for example with a curved orifice passing through the first disc and allowing a lateral escape of gas into the gap between the external tube wall and the inner wall of the hollow head. Likewise, the first disc integral with the shaft could be positioned underneath the second fixed disc. Preferably, a porous membrane 18, such as a Gore-Tex® membrane, is placed between the two discs 16, 17 to ensure that the valve is watertight even when the head is in the open position.

LIST OF PARTS (1) Valve
(2) Head
(3) Tube
(4) Watch case
(5) Shaft
(6) Step portion
(7) Gasket (8) Polymer material
  (a) Polymer material in a first space
  (b) Polymer material in a second space
(9) Chamber
(10) Spring
(11) Ring
(12) Orifice
  (a) First orifice
  (b) Second orifice
(13) Recess in the shaft
(14) Path
(15) Other spring
(16) First disc
(17) Second disc
(18) Membrane
(19) Gap

What is claimed is:

1. A safety valve including:
a tube intended to be fixed to a watch case,
a hollow head mounted for rotation about the tube and provided with a shaft extending into its hollow portion,
a first element fixedly mounted with respect to the head and
a second element integral with the head,
wherein the first element and the second element each include one or more passages allowing gas to flow, the rotational motion of the head allowing the passages of the first element and of the second element to be placed in communication for gas to escape from the interior to the exterior of the case in the event of overpressure inside the case or, conversely, allowing the passages of the first element and of the second element to be moved out of alignment to prevent gas escaping.

2. The valve according to claim 1, wherein the first element is a polymer material placed inside the hollow head and wherein the second element is the shaft.

3. The valve according to claim 2, wherein the polymer material fills a first space comprised between one end of the tube, the head and the shaft.

4. The valve according to claim 3, wherein the polymer material includes a first orifice serving as passage, the first orifice passing through the first space between the head and the shaft.

5. The valve according to claim 2, wherein the polymer material also extends into a second space comprised between the tube and the shaft.

6. The valve according to claim 5, wherein the polymer material includes a second orifice serving as passage, the second orifice passing through the second space between the tube and the shaft.

7. The valve according to claim 6, wherein a path is arranged between the polymer material placed in the second space and the tube at the second orifice.

8. The valve according to claim 2, wherein, on one portion of its circumference, the shaft includes a recess serving as passage.

9. The valve according to claim 8, wherein the recess extends on the shaft over a height at least equal to the distance separating the first orifice and the second orifice.

10. The valve according to claim 2, wherein the polymer material is chosen from among polyurethanes, elastomers, thermoplastics, thermosets, reinforced or non-reinforced composites.

11. The valve according to claim 1, wherein the first element is a disc placed around the shaft and integral with the tube and wherein the second element is another disc integral with the shaft and superposed on said disc.

12. The valve according to claim 11, wherein a porous membrane is placed between the two discs to ensure that the valve is watertight.

13. The valve according to claim 1, comprising means such as a spring or a thrust ball bearing to prevent axial movement of the head.

14. The valve according to claim 1, wherein the valve includes inside the tube a spring wound around the shaft and resting at one end on the first element and, at another end, on a ring placed around the shaft.

15. The valve according to claim 14, wherein the valve includes a gasket placed between the ring and a step portion arranged in the tube.

16. A watch including a case formed of a case middle, a back cover and a crystal delimiting a sealed volume in which is mounted a watch movement provided with means for displaying time information, wherein a valve according to claim 1 is mounted on the case.

17. The safety valve including:
a tube intended to be fixed to a watch case,
a hollow head mounted for rotation about the tube and provided with a shaft extending into its hollow portion,
a first element fixedly mounted with respect to the head and
a second element integral with the head, wherein the first element and the second element each include one or more passages allowing gas to flow, the rotational motion of the head allowing the passages of the first element and of the second element to be placed in communication for gas to escape, from the interior to the exterior of the case in case of overpressure inside the case or, conversely, allowing the passages of the first element and of the second element to be moved out of alignment to prevent gas escaping, and wherein said passages of the first element and of the second element are placed in and out of communication without any relative axial movement of the first and second elements.

* * * * *